United States Patent [19]

Twerdochlib et al.

[11] Patent Number: 5,152,309
[45] Date of Patent: Oct. 6, 1992

[54] VALVE CONTROL APPARATUS

[75] Inventors: Michael Twerdochlib, Oviedo; David E. Bateman, Geneva, both of Fla.

[73] Assignee: Westinghouse Electric Corp., Pittsburgh, Pa.

[21] Appl. No.: 706,912

[22] Filed: May 29, 1991

[51] Int. Cl.⁵ .............................................. G05D 7/06
[52] U.S. Cl. ........................................ 137/8; 137/480; 137/487.5
[58] Field of Search ...................... 137/486, 487.5, 8, 2

[56] References Cited

U.S. PATENT DOCUMENTS

| | | | |
|---|---|---|---|
| 3,776,249 | 12/1973 | Wailes | 137/486 X |
| 4,134,423 | 1/1979 | Mayer | 137/487.5 X |
| 4,690,163 | 9/1987 | Steinemann | 137/486 X |
| 4,813,443 | 3/1989 | Pounder | 137/487.5 |
| 4,926,903 | 5/1990 | Kawai | 137/486 X |

Primary Examiner—Alan Cohan

[57] ABSTRACT

The present invention provides a valve control apparatus which can be programmed to deliver a desired flow of gas. A valve 22 is connected to a stepper motor 28 which is controlled by a computer 32 to open or close the valve in steps within a gas flow line 24 to deliver a desired rate of flow. A flowmeter 30 is provided along the gas flow line 24 for measuring the flow and inputting this flow to the computer 32. The computer 32 calculates rate of flow information obtained from the flowmeter 30 and controls the stepper motor 28 to open or close the valve 22 as necessary in accordance with the received rate of flow information and a desired rate of flow preprogrammed into the computer 32. As a result, a precise desired rate of flow can be obtained. Also, position indicators 34 may be added to the valve 22 to indicate when the valve 22 is completely open or completely closed. The valve 22 may be provided with a return spring 36 to automatically close the valve 22 in the event of a power loss. The computer 32 may be programmed to detect a significant increase in the rate of gas flow being closing the valve 22 accordingly. Additionally, a pressure switch 38 may be provided along the gas flow line 24 to cause the valve 22 to close upon a pressure change. Finally, temperature 40 and pressure 42 sensors may be added along the gas flow line so that the computer 32 can calculate and maintain a specific mass flow of gas.

21 Claims, 4 Drawing Sheets

VALVE CONTROL APPARATUS

BACKGROUND OF THE INVENTION

1. Field of the Invention

The present invention is directed to a valve control apparatus for controlling a gas control valve to deliver a precisely measured flow of gas, and more particularly, to a valve control apparatus which controls a valve to precisely obtain a particular rate of gas flow or maintain the flow within a particular range, by controlling the valve to open or close in accordance with a measured rate of flow to obtain a desired rate of gas flow.

2. Description of the Related Art

It is often necessary to control or limit a flow of gas quickly and precisely. For example, a gas flow line can have a flowmeter for monitoring gas flow. The flowmeter is a delicate and expensive device. If the gas flow in the gas flow line exceeds a certain rate (or delivery), the flowmeter will be damaged or destroyed.

For example, in an Air Inleakage Monitor (AIM), produced by Westinghouse Electric Corp., a flowmeter is used to measure the leakage of air into a steam turbine. As shown in FIG. 1, air is routed from the pipe 2 through a flowmeter 4 via the by-pass 6 as long as the flow is below 50 cfm. However, when air flow in the by-pass reaches 50 cfm, a bladder 8 is deflated by a valve control unit 10 so that the air flows through the pipe 2, thus significantly reducing air flow through the by-pass 6. The by-pass 6 is connected to the flowmeter 4 at a pipe joint 11 and to an extension of pipe 2 at pipe 12. During normal operation of the turbine, deflation of the bladder is sufficient to prevent air flow through the flowmeter from exceeding 50 cfm, so that damage to the flowmeter is avoided and measurement of air flow by the flowmeter can continue, although less accurately. However, there are certain circumstances in which net air flow through the air inleakage monitor is considerably higher than in normal operation. For example, during pump-down the net flow can reach and exceed 6000 cfm. Under these circumstances, the air flow through the flowmeter can exceed 50 cfm even when the bladder is deflated. Thus, the bladder device offers no protection against damage or destruction to the flowmeter.

SUMMARY OF THE INVENTION

An object of the present invention is to provide control of a gas flow with a high degree of precision.

Another object of the present invention is to provide control of the gas flow in accordance with a preprogrammed desired flow rate.

A further object of the present invention is to provide control of a gas flow in accordance with a measured current flow rate.

Also, an object of the present invention is to prevent a gas flow if the rate of flow reaches a certain amount.

Still another object of the present invention is to reduce or prevent a gas flow if the rate of flow increases very rapidly.

An object of the present invention is to prevent damage to equipment such as a flowmeter due to an excessive rate of flow.

A still further object of the present invention is to prevent damage to a flowmeter by controlling the amount of gas that flows therethrough without sacrificing continuing operation of the flowmeter when possible.

Another object of the present invention is to provide a valve control apparatus whose operation can be verified.

A further object of the present invention is to provide a valve control apparatus that automatically prevents a gas flow in the event of a power loss.

Another object of the present invention is to provide a valve control apparatus that automatically prevents a gas flow immediately upon detection of a sudden large increase in gas flow.

A still further object of the present invention is to provide a control apparatus that quickly and briefly prevents a gas flow upon detection of excessive pressure in the environment in which it operates.

Finally, an object of the present invention is to provide a valve control apparatus that provides a constant mass flow of gas independent of gas pressure and temperature.

The present invention attains the above objects by providing a valve control apparatus which can be programmed to deliver a desired flow of gas. A valve is connected to a stepper motor which is controlled by a computer to open or close the valve within a gas line to deliver a desired rate of flow. A flowmeter is provided along the gas line to provide a rate of flow signal and this signal is input to a control device such as a computer. The computer determines rate of flow from the flowmeter input and controls the stepper motor to open or close the valve as necessary in accordance with the rate of flow and pursuant to a desired rate of flow preprogrammed into the computer. In this manner, a precise desired rate of flow can be obtained.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 2:
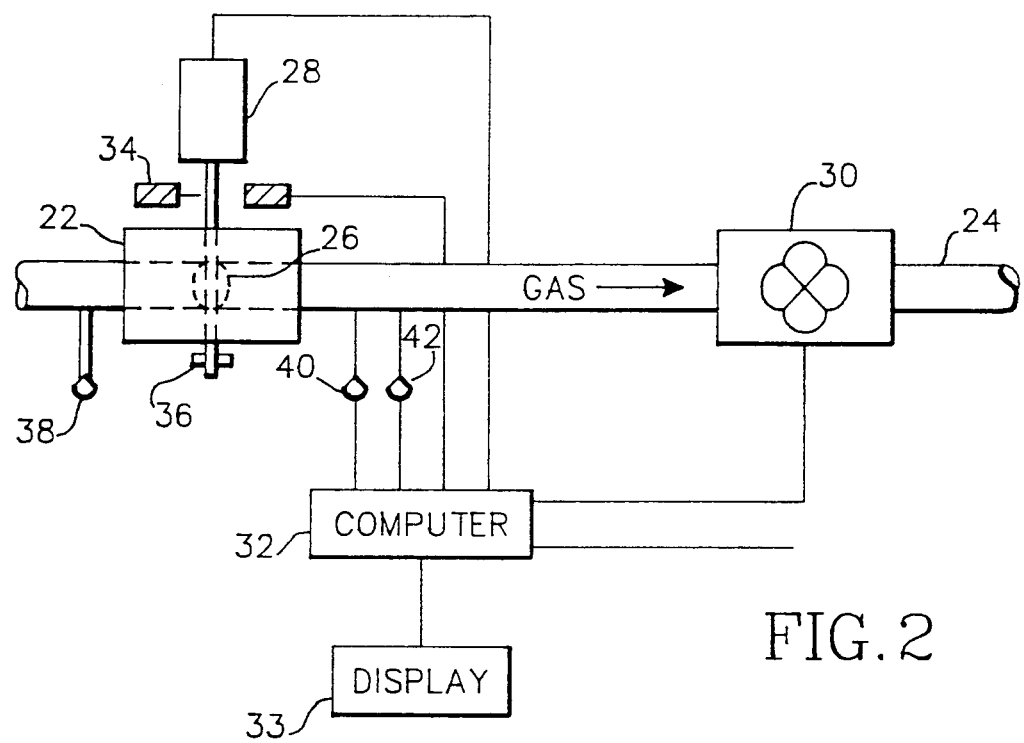
FIG. 2 is an illustration of the computer controlled gas control valve of the present invention.

FIG. 2 is an illustration of the valve control apparatus of the present invention. A conventional throttle plate valve 22 is provided in a gas flow line 24 to control the rate of gas flow therein. The plate valve is preferably inserted between the pipes at joint 12 and a corresponding thickness spacer is provided in joint 11. However, other positions along pipe 6 are possible. The valve is manufactured by Westinghouse. The supplier to Westinghouse is Electrical Design and Development, 7240 Old Cheney Hwy., Orlando, Fla. 32807. The throttle plate valve 22 has a throttle plate 26 positioned within the gas flow line 24. The throttle plate 26 is movable within the gas flow line 24 by a conventional stepper motor 28 to allow a variable amount of gas to flow through the throttle plate valve 22. The stepper motor 28 adjusts the throttle plate 26 in small increments so as to provide a precise opening that may fall anywhere within a wide range from all the way open to all the way closed.

A flowmeter 30, like the flowmeter 4 of the prior art, is also provided in the gas flow line 24 at a position downstream from the throttle plate valve 22. The flowmeter 30 indicates a rate of gas flow along the gas flow line 24 by outputting to a computer 32 tach pulses representing rotations of the flowmeter 30. A suitable computer 32 is a SC87C451CCA68 available from SYGNETICS.

The computer 32 calculates the gas flow from the tach pulses and displays the flow on a display 33 and calculates a rate of change in the gas flow by comparing averages of the most recently calculated gas flows. The computer 32 is also connected to the stepper motor 28. The computer 32 controls operation of the stepper motor 28 in accordance with a desired rate of gas flow preprogrammed in the computer 32, in accordance with a current gas flow, and in accordance with the rate of change of the gas flow. This process will be discussed in more detail with respect to FIGS. 3A and 3B.

For example, in a first embodiment of the present invention, the computer 32 is programmed to maintain the rate of gas flow at just less than a specified amount preprogrammed in the computer. When the computer 32 determines that the gas flow exceeds the specified amount and the flow rate is increasing, it operates the stepper motor 28 to close the throttle plate 26 by a step. If, on the other hand, the computer 32 determines that the gas flow is under the specified amount and the rate of low is not increasing, it operates the stepper motor to open the throttle plate 26 by a step. The computer 32 constantly reads the tach pulses from the flowmeter 30 and calculates the gas flow upon every tach pulse so that precise and rapid control of the throttle plate valve 22 can be obtained. This process will be described in detail in FIGS. 3A and 3B and the related discussion thereto.

Figure 1:
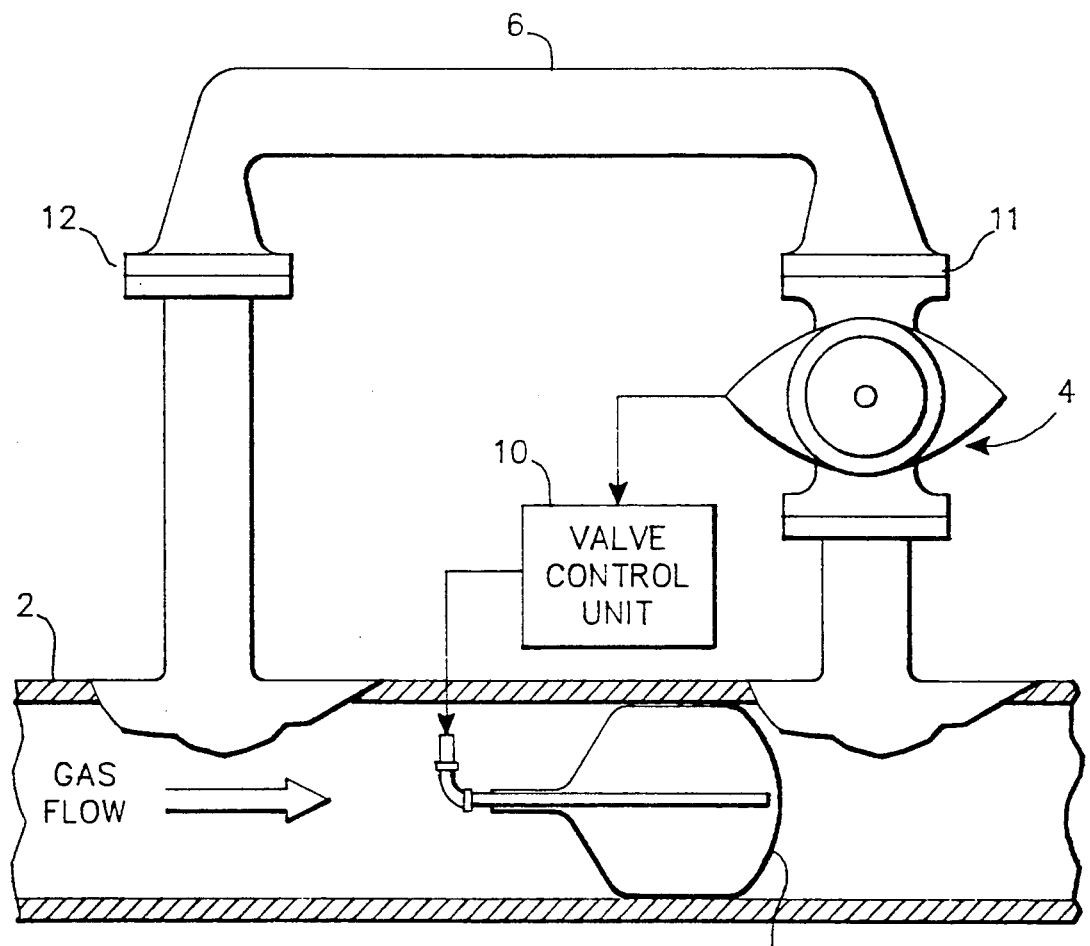
FIG. 1 illustrates a prior art air inleakage monitor without the computer controlled gas control valve provided by the present invention.

As discussed, the prior art Air Inleakage Monitor shown in FIG. 1 is incapable of preventing damage to the flowmeter 4 when net air flow through the air inleakage monitor is so excessive that air flow through the by-pass exceeds 50 cfm even when the bladder is deflated or when an air surge occurs. However, by providing the computer controlled gas control valve 22 at joint 12 along the by-pass 6 in FIG. 1, air flow through the by-pass 6 can be precisely controlled, so that the valve 22 limits air flow to the flowmeter 4 when the computer calculates that the gas flow approaches 50 cfm. As a result, damage to the flowmeter 4 is avoided and, when air flow through the flowmeter 4 is not great enough to damage the flowmeter 4, the operation of the flowmeter 4 can be continued as efficiently as possible.

In a second embodiment of the present invention, the throttle plate valve 22 is provided with position indicators 34. The computer reads position data from the position indicators 34 to determine if the throttle plate 26 is completely open or completely closed within the gas flow line 24. The computer uses this information to verify operation of the throttle plate valve 22. For example, if the computer has instructed the throttle plate valve 22 to maintain the throttle plate 26 to be completely open within the gas flow line 24, the position indicators 34 should indicate this position to the computer. If the position data provided by the position indicators 34 is not consistent with the instruction provided to the throttle plate valve 22, the computer determines that a malfunction has occurred and display an indication of the malfunction of the display 33.

In a third embodiment of the present invention, the throttle plate valve is provided with a return spring 36 which causes the throttle plate valve 22 to automatically close in the event of a power loss. The return spring 36 should be strong enough to close the throttle plate 26, but weak enough so as not to overpower the stepper motor. A spring meeting these requirements can be made by Servo Meter Corp. The spring is 25 ounce inches when closed and 30 ounce inches when open.

In a fourth embodiment of the present invention, the computer 32 detects an increase in the rate of gas flow through the flowmeter 30 when the rate of tach pulses increases, and operates the stepper motor to begin closing the throttle plate valve 22 when the rate of increase of the gas flow is significant (i.e. 0.8 cfm per tach pulse), so as to anticipate a sudden large flow increase. Specifically, since the computer 32 continually calculates the gas flow, gas flows determined by the computer 32 over a period of time are averaged and compared to a previous average to calculate a rate of change in the gas flow. If the rate of change is an increase which exceeds a preprogrammed amount, the computer operates the stepper motor to begin to close the throttle plate valve. The computer can be similarly programmed to respond to a sudden decrease in flow.

In a fifth embodiment of the present invention, a pressure switch 38 is provided along the gas flow line 24 and connected to the computer. When an excessive gas flow occurs along the gas flow line 24, the excessive flow is detected by the pressure switch 38 and indicated to the computer. In response, the computer rapidly closes the throttle plate valve 22 so as to prevent a gas flow through the flowmeter 30 or other sensitive equipment provided along the gas flow line 24 that might damage the flowmeter 20 or the sensitive equipment. Control and analysis of the gas flow is then continued starting with the throttle plate valve 22 completely closed.

In a sixth embodiment of the present invention, a temperature sensor 40 and pressure sensor 42 are provided along the gas flow line and connected to the computer 32. The computer 32 reads temperature data and pressure data from these sensors and uses this data to compute a desired mass flow of the gas that is independent of the gas pressure and temperature. Specifically, the flow rate $v$ (liters/sec), as calculated by the computer as explained above, is multiplied by Pressure (in atmosphere)\temperature (in Kelvin)×1\R where R is the ideal gas constant R=0.082 liter atmospheres mole Kelvin.

FIG. 3 is a flowchart of the control process performed by the computer to control the gas control valve in the present invention. It is preferred that this process be implemented in a language such as C and 851 product line assembly language. The computer reads 50 tachometer type (tach) pulses output by the flowmeter and determines 52 whether a level 1 interrupt flag has been set indicating that the process denoted level 1 in FIG. 3 is to be executed. The level 1 interrupt flag is set if a tach pulse is received from the flowmeter or if 4.0 seconds elapses. If the level 1 interrupt flag has been set, the computer reads 54 a count that has accumulated between the tach pulses. If the count is determined 56 to exceed a maximum count, such as 44,444,460, which indicates that so much time has passed that the flowmeter is not turning, the flow is set 58 to a minimum flow amount, such as 0.1 cfm. If, however, the count does not exceed the maximum count, then the computer calculates 60 the flow with an inverse function of the count, such as in the formula:

$$\text{FLOW} = \left(\frac{4,444,444}{\text{Count} - 16}\right) \times 10$$

Next, the computer 32 calculates 62 an average flow (A) by averaging the most recently determined flows. For example, an average is computed for the last three flows. The computer 32 calculates 64 a conventional rate of change (R) of the flow using the most recently calculated average flows. For example, if the flow is below 10 cfm, the most recently computed average is used to calculate the rate of change. If the flow is between 10 and 20 cfm, an average of the last three averages is used. If the flow is greater than 20 cfm, the last four averages are used. If the computer determines 66 both that the average flow is less than 50 CFM and that the rate of change of the flow is not increasing, then the computer 32 opens 68 the valve by one step by transmitting a signal to the valve. If the computer 32 determines 70 that the average flow is greater than 50 CFM or that the rate of change of flow is increasing, then the computer 32 closes 72 the valve by one step by transmitting a signal to the valve. Otherwise, the valve remains in its current position.

By executing the level 1 process for every tach pulse received from the flowmeter, the computer maintains precise and immediate control of the gas control valve. A rapid change in the amount of gas flow is thereby responded to quickly.

Figure 3B:
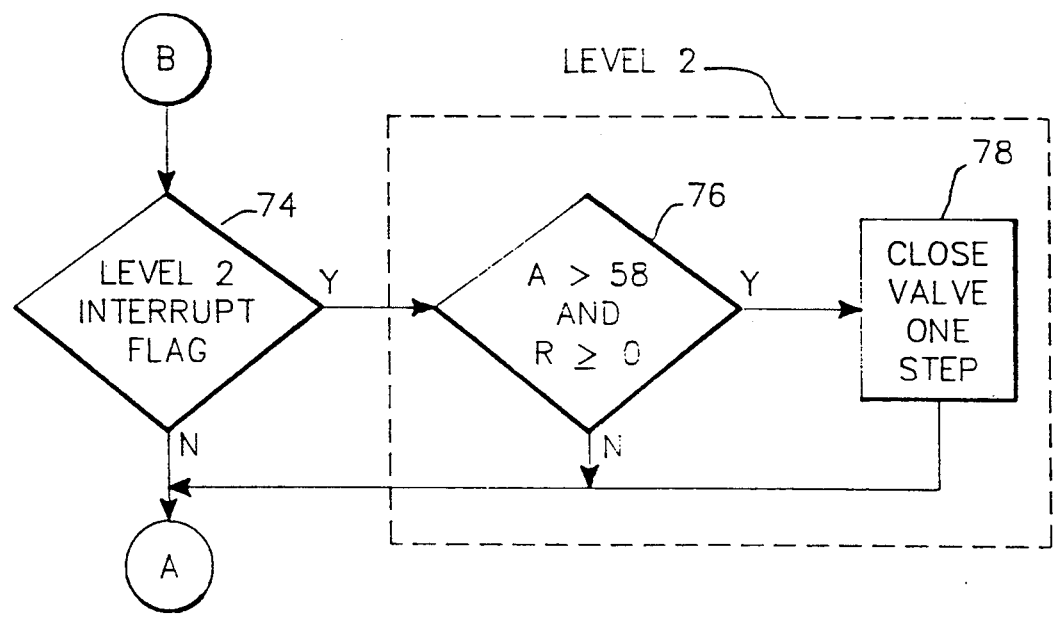
FIGS. 3A and 3B are a flowchart of the control process performed by the computer to control the gas control valve in the present invention.
Figure 3A:
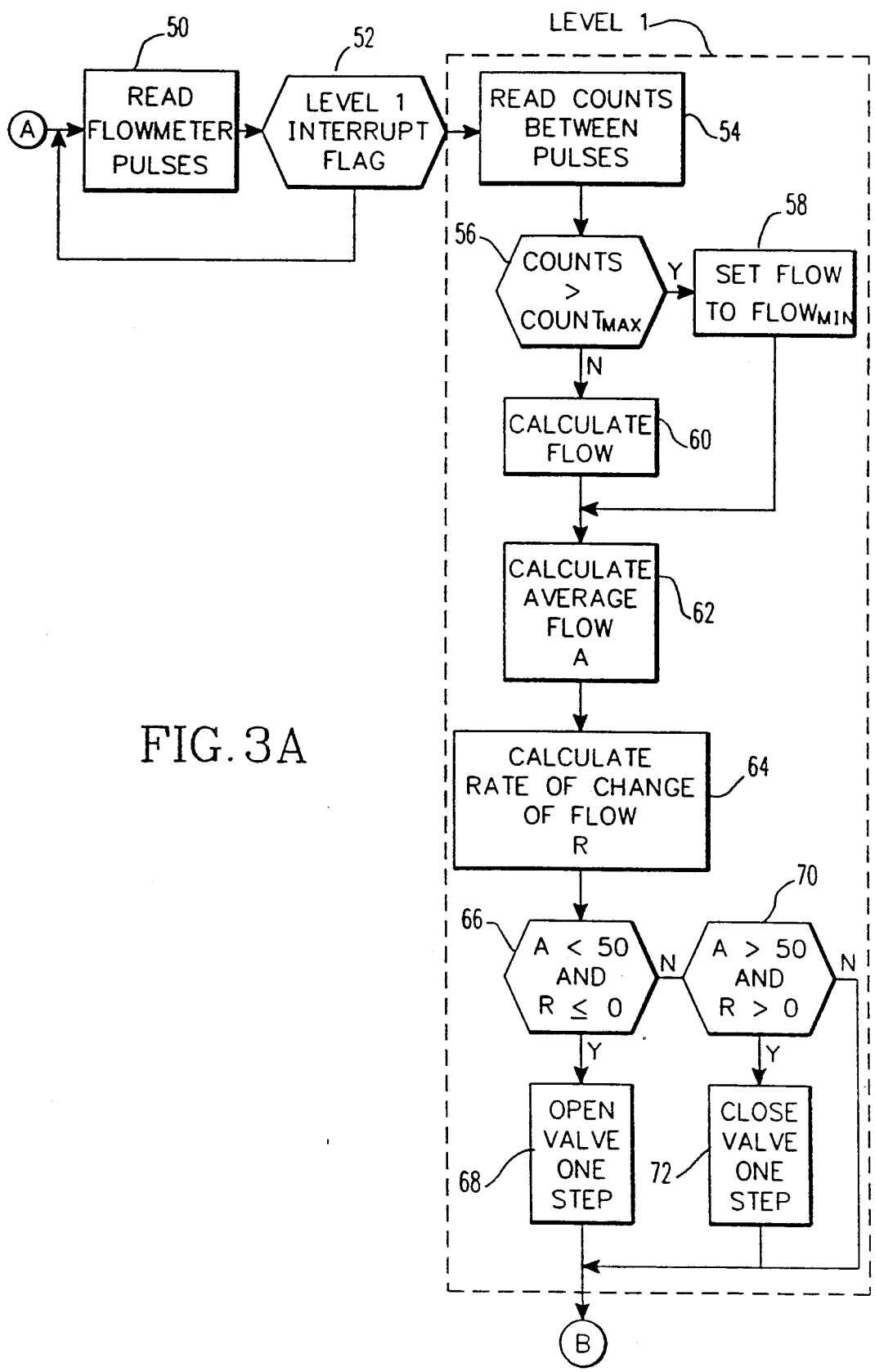

The computer 32 executes a level 2 process, as illustrated in FIG. 3B, every 0.1 seconds to provide a highly accurate control of the gas flow without overcontrolling the valve. As a result, if 0.1 seconds has elapsed since the last execution of the level 2 process, at the end of the level 1 process the level 2 process is executed. Thus, the computer 32 determines 74 whether a level 2 interrupt flag is set indicating that 0.1 seconds has elapsed. If so, the computer determines 76 whether the average flow exceeds 58 CFM and the rate of change of flow is not decreasing. If both these conditions are met, the computer closes 78 the valve by one step by transmitting a signal to the valve. A fine control is thus maintained of the gas control valve by using a position change every 0.1 seconds if necessary. As a result, the computer controlled gas control valve is preferably utilized in an air inleakage monitor to prevent or limit gas flow through the flowmeter only when the flow becomes so excessive that the flowmeter could be damaged. At all other times, the gas flow is allowed to proceed and the flowmeter 4 can be utilized to measure the gas flow.

Figure 4:
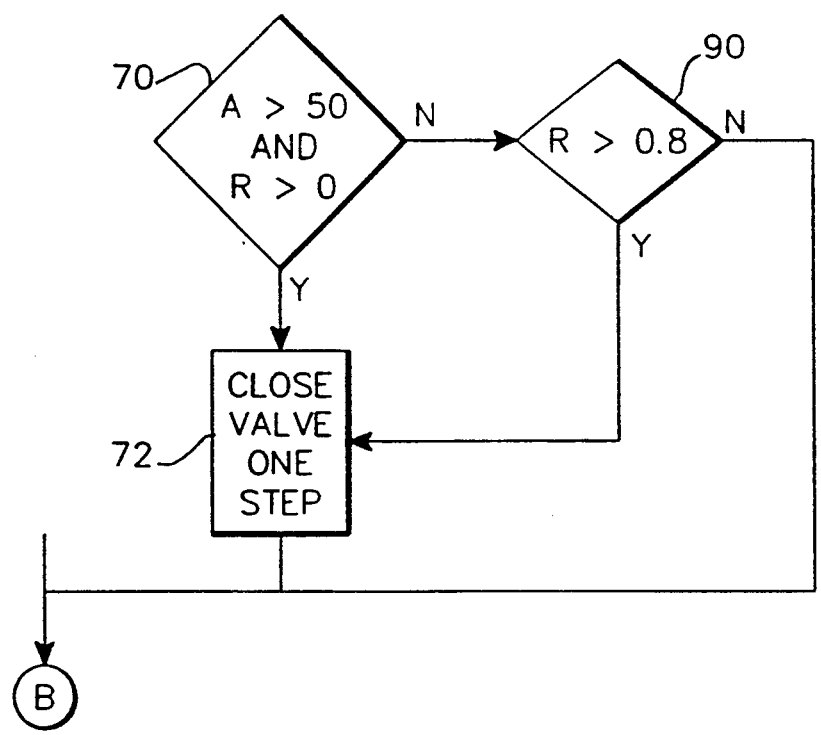
FIG. 4 is a flowchart of the control performed in the fourth embodiment of the present invention.

The process described in FIGS. 3 and 4 is performed in a continual loop within the computer so that the computer continually checks the level 1 and level 2 interrupt flags to determine whether the level 1 and level 2 processes should be executed. Thus, the gas control valve is controlled in real time and the gas flow is controlled quickly and accurately.

FIG. 4 is a flowchart of the control performed by the computer 32 in the fourth embodiment. As discussed, in the fourth embodiment, the computer 32 begins closing the stepper motor when the gas flow rate increases significantly. In FIG. 4, step 90 is provided in addition to the control shown in FIG. 3. The computer determines 90 whether the rate of change exceeds 0.8 cfm per tach pulse. If so, the computer closes the valve by one step by transmitting a signal to the valve.

Figure 5:
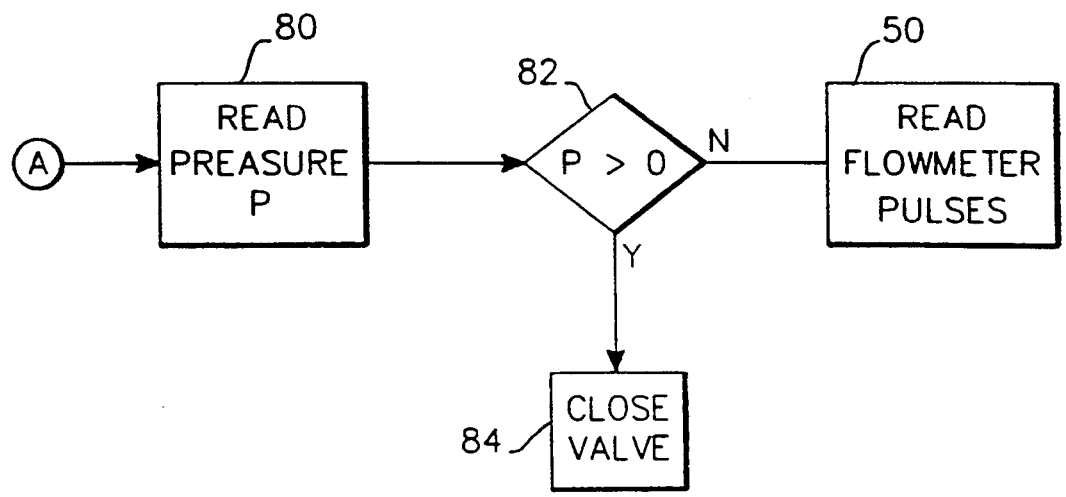
FIG. 5 is a flowchart of the control performed in the fifth embodiment of the present invention.

FIG. 5 is a flowchart of the control performed in the fifth embodiment. As discussed in the fifth embodiment, the computer responds to an excessive gas flow detected by the pressure switch 38 by rapidly closing the valve. In FIG. 4, the computer reads 80 a pressure signal P from the pressure switch 38. If the pressure exceeds a threshold amount, then the pressure signal changes, for example, from 0 to 1. The computer determines 82 whether the pressure signal indicates an excessive pressure. If so, the computer closes 84 the valve by transmitting a signal to the value, and control proceeds to step 50, as in FIG. 3.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A valve control apparatus for precisely controlling a fluid flow in a fluid flow line, comprising:
    measuring means provided in the fluid flow line, and for producing a flow signal corresponding to the fluid flow, a temperature signal corresponding to fluid temperature and a pressure signal corresponding to fluid pressure;
    a valve provided inside the fluid flow line; and control means for controlling said valve to vary flow in the gas flow line responsive to the flow signal, the temperature signal and the pressure signal.

2. A valve control apparatus according to claim 1, wherein said control means controls said valve responsive to a rate of change of the flow.

3. A valve control apparatus according to claim 1, further comprising position indicators operatively connected to said valve and indicating when said valve is fully open and fully closed to said control means.

4. A valve control apparatus according to claim 1, further comprising a return spring operatively connected to said valve and closing said valve during a power loss.

5. A valve control apparatus according to claim 1, further comprising a pressure switch provided within the fluid flow line, and said control means closes said valve when said pressure switch detects a pressure exceeding a predetermined pressure.

6. A valve control apparatus according to claim 1, further comprising a temperature sensor and a pressure sensor, provided within the fluid flow line and producing the temperature and pressure signal, and
    said control means calculates a constant mass flow of fluid based on the temperature and pressure and flow signals, and said control means controls said valve to obtain the constant mass flow of fluid.

7. A valve control apparatus according to claim 2, wherein said control means moves said valve to narrow the opening when the flow exceeds a predetermined flow and when the rate of change of flow exceeds a predetermined rate of change.

8. A valve control apparatus according to claim 2, wherein said control means moves said valve to broaden the opening when the flow does not exceed a predetermined flow and when the rate of change does not exceed a predetermined rate of change.

9. A valve control apparatus according to claim 2, wherein:
said flow measuring means comprises a flowmeter, and the flow signal comprises tach pulses corresponding to rotations of the flowmeter caused by the fluid flow, and
said control means controls said valve when said flowmeter produces one of the tach pulses.

10. A valve control apparatus according to claim 2, wherein said control means controls said valve when a predetermined time has elapsed.

11. A valve control apparatus for precisely controlling a fluid flow in a fluid flow line, comprising:
a flowmeter, disposed in the fluid flow line, and measuring a fluid flow in the fluid flow line by outputting tach pulses corresponding to rotations of said flowmeter caused by the fluid flow;
a throttle plate valve, disposed along the fluid flow line and having a throttle plate movable inside the fluid flow line to create an opening in the fluid flow line;
a stepper motor, operatively connected to said throttle plate valve, and moving the plate in said throttle plate valve a step at a time to change the opening;
a temperature sensor, disposed along the fluid flow line and measuring a temperature in the fluid flow line;
a pressure sensor, disposed along the fluid flow line and measuring a pressure in the fluid flow line; and
a computer, operatively connected to said flow meter, said temperature sensor, said pressure sensor and said stepper motor, and controlling said stepper motor to open and close the throttle plate in said throttle plate valve responsive to the temperature, the pressure and the tach pulses received from said flowmeter.

12. A method for precisely controlling a fluid flow in a fluid flow line, comprising the steps of:
(a) measuring the fluid flow in the fluid flow line;
(c) measuring a temperature of the fluid in flow line;
(d) measuring a pressure of the fluid in the flow line; and
(e) varying an opening in the fluid flow line by moving a valve responsive to the fluid flow, temperature and pressure measures.

13. A method according to claim 12, wherein step (a) includes calculating a rate of change of the fluid flow, and step (e) includes varying the opening in the fluid flow line by moving the valve responsive to the rate of change of the measures.

14. A method according to claim 12, wherein step (a) includes reading tach pulses from a flowmeter and calculating the fluid flow based on a time between the tach pulses.

15. A method according to claim 12, further comprising step (f) closing the valve when the rate of change of the fluid flow exceeds a predetermined rate of change.

16. A method according to claim 13, wherein step (e) includes moving the valve to narrow the opening when the fluid flow exceeds a predetermined flow and when the rate of change of the fluid flow exceeds a predetermined rate of change.

17. A method according to claim 13, wherein step (e) includes moving the valve to broaden the opening when the fluid flow does not exceed a predetermined flow and when the rate of change of the fluid flow does not exceed a predetermined rate of change.

18. A method according to claim 14, further comprising step (c), repeating steps (a) and (e) every time the flowmeter produces one of the tach pulses.

19. A method according to claim 14 further comprising step (c) repeating steps (a) and (e) every time a predetermined time elapses.

20. A method for precisely controlling fluid flow in a fluid flow line, comprising the steps of:
(a) reading pulses from a flowmeter indicating an amount of the fluid flow in the fluid flow line;
(b) performing steps (c) through (h) when one of the pulses is read and every predetermined time period;
(c) obtaining a time count between times when each of the pulses is read;
(d) calculating a flow based on an inverse function of the count when the count exceeds a maximum count, and setting the flow equal to a minimum flow when the count exceeds the maximum count;
(e) calculating an average flow based on the flow and previous flows;
(f) calculating a rate of change of flow based on the average flow;
(g) opening a valve in the fluid flow line by a step when the average flow is less than a predetermined flow and when the rate of change of flow is decreasing or equal;
(h) closing the valve by a step when the average flow exceeds a predetermined flow and when the rate of change of flow is increasing;
(i) performing step (j) every predetermined time period;
(j) closing the valve when the average flow exceeds a second predetermined flow and when the rate of change of flow is not decreasing; and
(k) repeating steps (a) through (j).

21. A method according to claim 20, further comprising the steps of:
(l) obtaining a pressure within the fluid flow line; and
(m) closing the valve when the pressure exceeds a predetermined amount.

* * * * *